United States Patent Office 3,422,211
Patented Jan. 14, 1969

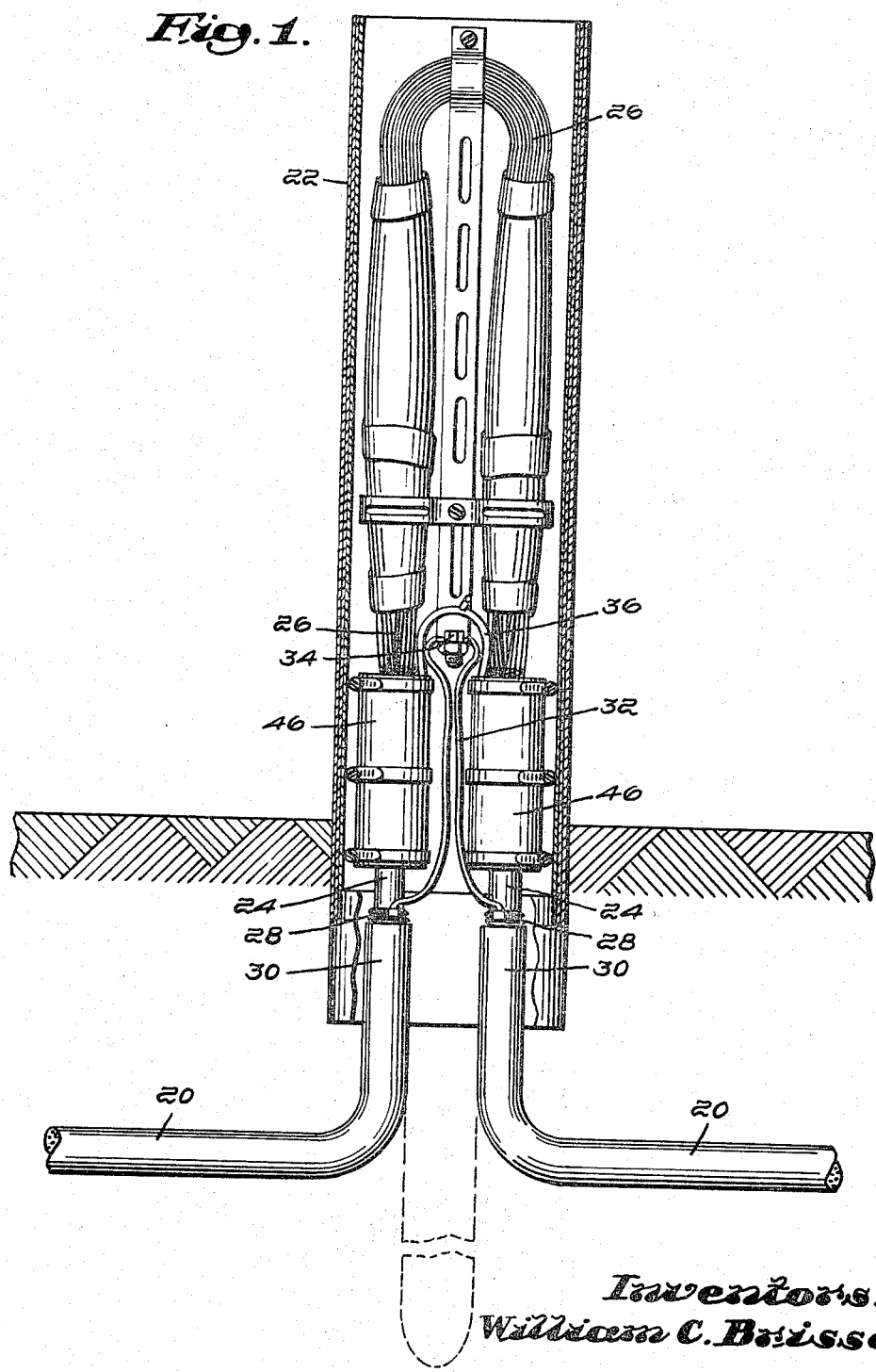

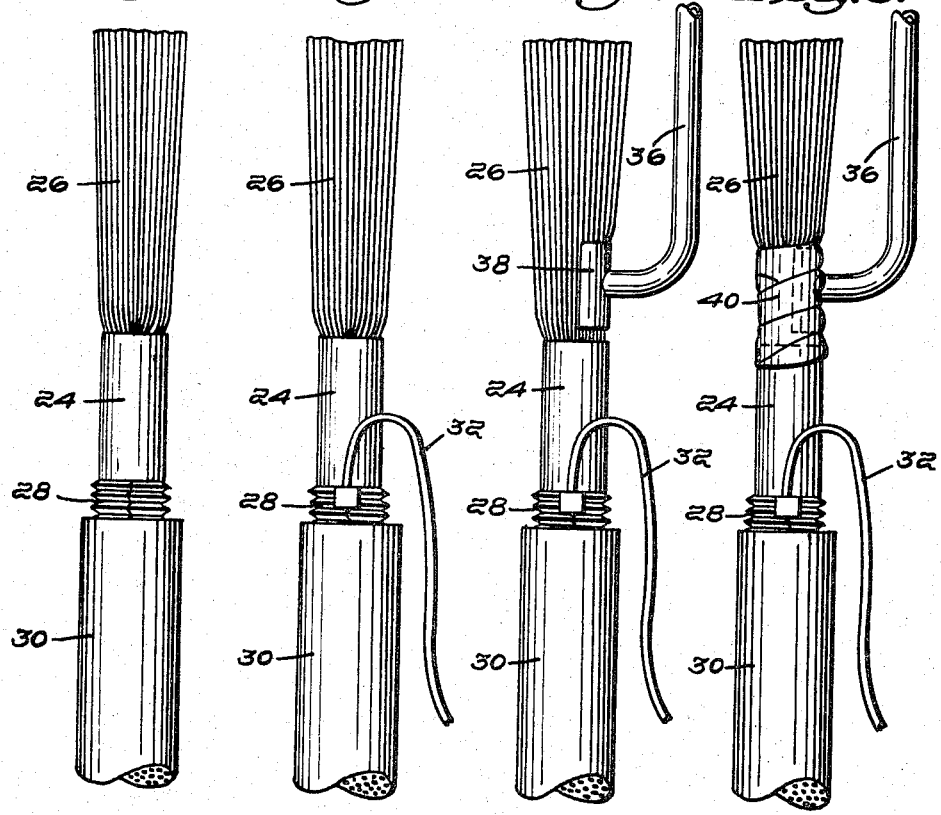
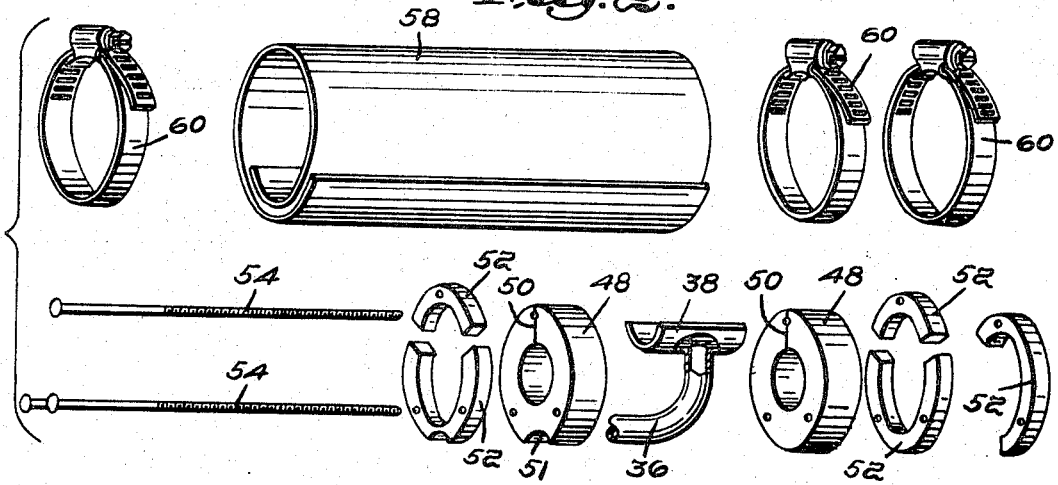

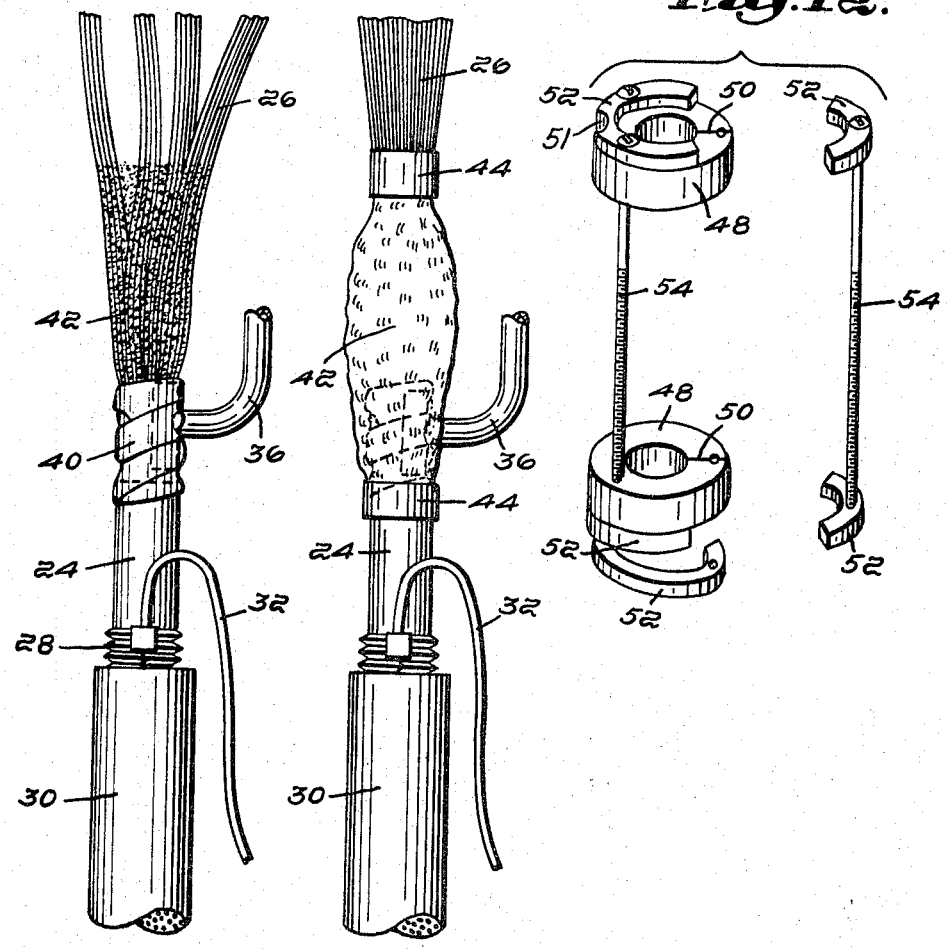

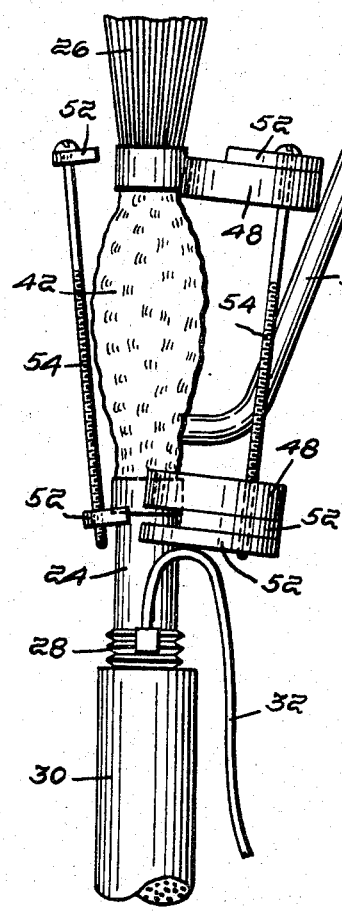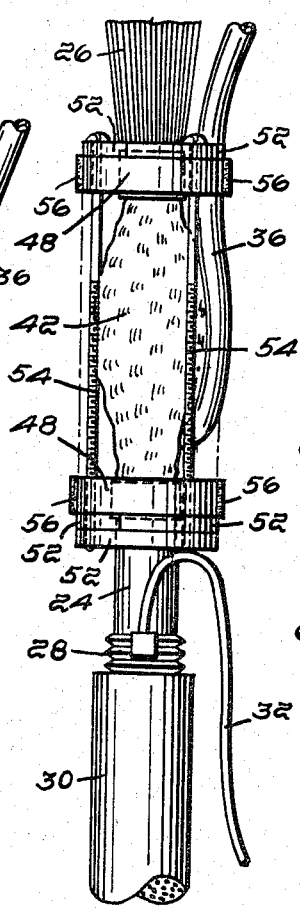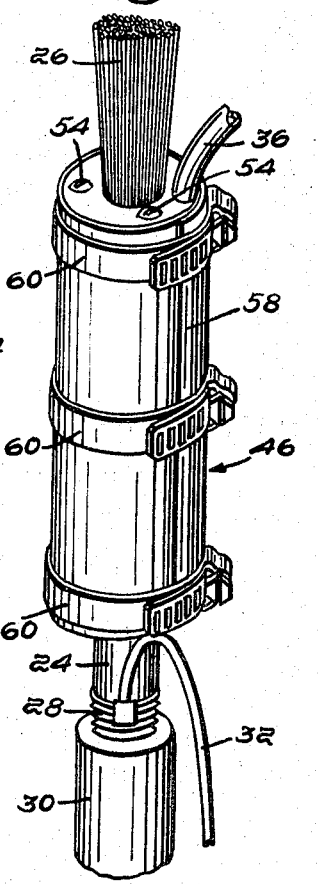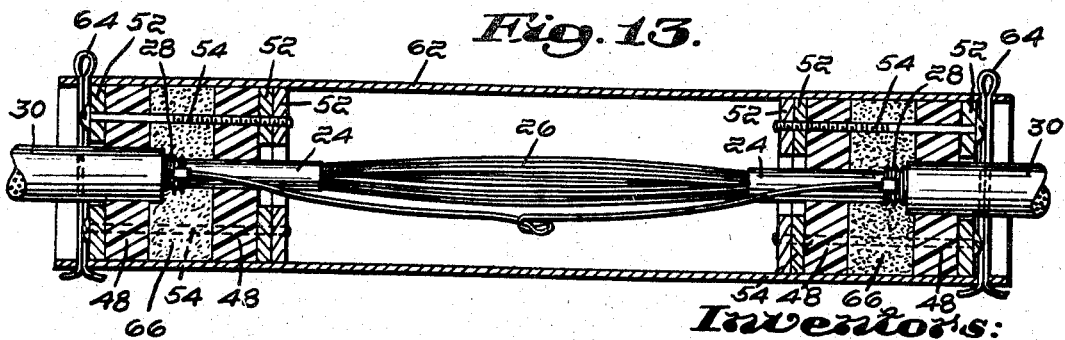

3,422,211
APPARATUS FOR ESTABLISHING A
FLUID-TIGHT BYPASS
William C. Brisse, Laconia, and René C. Vincent, Gilmanton Iron Works, N.H., assignors to Laconia Metal Products, Inc., Laconia, N.H., a corporation of New Hampshire
Filed Jan. 5, 1967, Ser. No. 607,574
U.S. Cl. 174—22                        2 Claims
Int. Cl. H02g 15/24; H02g 9/00

ABSTRACT OF THE DISCLOSURE

Apparatus for establishing a fluid-tight bypass between two internally pressurized non-continuous electrical cable sections to permit access to the exposed conductors therebetween without cable pressure loss. A flanged bypass tube is placed against the exposed conductors, an imperforate envelope is wrapped from the cable jacket over and past the bypass flange, a layer of moldable, non-setting packing compound is packed over the envelope sealing it to the cable jacket and plugging the envelope end, and an enclosure is resiliently constricted around to produce continuous pressure on the packing compound layer. The bypass tube extends through an aperture in the enclosure and connects with a similar tube extending from the other cable section.

---

This invention finds its principal use in the communications industry. It has particular application to telephone cables which carry a plurality of electrical conductors therein. Such conductors must be kept in a moisture-free condition to prevent electrical short circuits and crosstalk annoyance.

In the communications field, cables often extend for long distances above or below ground. Although the exterior jackets of such cables are made as gas and liquidtight as possible by known procedures, a slight degree of jacket porosity always exists even when the cable is new. Furthermore, breaks occasionally occur in installed cables because of rodents, farm plows, excavating equipment, etc. This jacket porosity or breakage, unless otherwise prevented, will permit moisture or contaminated air to penetrate the jacket causing an interruption of cable service.

One method of overcoming this moisture entry problem is to force a gas or a dielectric liquid (such as refined oil) into the jacket interior and maintain the fluid under constant pressure either in a static or flowing condition. The pressurized fluid will continuously leak through any small jacket break thereby creating a block to the entry of moisture. Satisfactory results with this method have been achieved employing a constant pressure in the range of about 3 to 40 p.s.i.

If the cable jacket were continuous from end to end, the problem of maintaining fluid pressure therein would be relatively simple. However, since many types of cables, such as telephone cable, must be opened and entered at numerous locations along its length for the purpose of splicing and tapping service lines to equipment in adjacent areas, the problem of maintaining constant fluid pressure within the cable jacket is more complex.

For example, referring to direct buried telephone cable, the cable is generally brought above ground at spaced intervals into protective access receptacles called pedestal positions. At these pedestal positions, the cable jacket is stripped away exposing the individual electrical conductors for splicing or tapping. Obviously, unless suitable measures are taken, the pressurized fluid within the jacket will completely exhaust at the pedestal position and the pump means could never rebuild the necessary pressure level. Clearly, a way had to be found to effectively connect the jacket portions on each side of the pedestal position so that fluid could be pumped along the entire length of the cable exhausting only at the relatively small jacket pores and breaks (in a static system) or additionally at the bleed orifice (in a flow system). The major difficulty in constructing such a bypass unit is to create an effective fluid seal on either side of the pedestal position.

To our knowledge, previous attempts to provide an effective bypass construction have been commercially unsatisfactory for various reasons. Our invention overcomes the many problems by employing a unique method for establishing a fluid-tight bypass and by providing a unique bypass construction. Briefly, the preferred embodiment of our invention comprises a method of first, stripping a length of jacket from the cable to expose the underlying electrical conductors; second, positioning the flanged end of a hermetic bypass tube against the exposed conductors near the stripped jacket end; third, applying a substantially imperforate envelope of sheathing material around the cable extending from the cable jacket over and beyond the bypass tube flange; fourth, applying a layer of moldable, non-setting packing compound over and beyond both ends of the sheathing envelope sealing one envelope end to the cable jacket and completely inundating the interstices of the electrical conductors to seal the other envelope end; fifth, positioning an adjustable resilient enclosure around the packing compound layer while leading the bypass tube exteriorly of the enclosure; and sixth, constricting the enclosure to resiliently compress the packing compound layer to produce a continuously fluid-tight encapsulation of the stripped jacket end while maintaining a clear fluid flow path through the bypass tube.

Our invention also comprises, as a preferred embodiment, the resulting bypass assembly and, as an alternate embodiment, a reel end splice kit usable also as a severed cable repair kit.

Accordingly, it is an object of this invention to provide a method for establishing a fluid-tight bypass that is quick and easy to perform, employs inexpensive constituents, can be readily performed in the field over a wide range of temperatures and humidity conditions and produces a structure which can be placed in operation immediately upon completion.

It is a further object of this invention to provide a fluid-tight bypass construction which is effective over a long period of time, is capable of immediate and simple re-establishment in the event a leak occurs or cable re-entry is necessary, is non-toxic and non-irritating to the installer and remains effective despite ambient temperature and humidity changes.

Other objects and advantages of this invention will be apparent from a study of the accompanying drawings and descriptive matter in which is illustrated and described a preferred embodiment of the method and preferred and alternate embodiments of the apparatus of our invention.

In the drawings:

FIG. 1 is a view in elevation showing a pedestal position with access cover removed employing a bypass unit embodying the invention;

FIG. 2 is an exploded view in perspective of the components which are assembled to form the receptacle and bypass tube;

FIG. 3 is a view in elevation of the stripped end of a cable showing the jacket and the interior electrical conductors;

FIG. 4 is a view in elevation of the cable of FIG. 3 wherein the grounding harness has been attached to the copper liner;

FIG. 5 is a view in elevation of the cable of FIG. 4 wherein the bypass tube flange has been positioned against the electrical conductors;

FIG. 6 is a view in elevation of the cable of FIG. 5 wherein the envelope of sheathing material has been wrapped around the cable jacket extending over and beyond the tube flange;

FIG. 7 is a view in elevation of the cable of FIG. 6 wherein a quantity of moldable, non-setting packing compound has been worked into the interstices of the electrical conductors to block the open end of the sheathing envelope;

FIG. 8 is a view in elevation of the cable of FIG. 7 wherein an additional layer of packing compound has been applied over the sheathing envelope;

FIG. 9 is a view in elevation of the cable of FIG. 8 wherein the resilient washers, locking end plates and take-up bolts of the receptacle have been pre-positioned around the packing compound layer;

FIG. 10 is a view in elevation of the cable of FIG. 9 wherein the resilient washers, locking end plates and take-up bolts of the receptacle have been assembled around the packing compound layer;

FIG. 11 is a view in perspective of the cable of FIG. 10 wherein the bypass tube has been led through one of the resilient washers, the cover has been assembled over the resilient washers, the straps have been cinched tightly around the cover and the take-up bolts have been tightened against the locking end plates;

FIG. 12 is a view in perspective of the disassembled resilient washers, locking end plates and take-up bolts; and FIG. 13 is a view in elevation, partly cut away, of an alternate fluid-tight bypass unit specifically adapted for the repair of severed buried cables without the necessity of a pedestal position.

Referring now more particularly to the drawings, FIG. 1 illustrates a pedestal position for a direct buried telephone cable. There typically are a plurality of such aboveground positions along the buried telephone cable trunk and distribution lines where access to the cable can be had for purposes of splicing, tapping or inspection. At such pedestal positions, the buried telephone cable 20 is formed into an upstanding loop within the pedestal housing 22 (which has an unshown outer casing) and the cable jacket is stripped away to expose its interiorly carried electrical conductors.

The type of cable with which this invention is particularly well suited to be employed has a polyethylene jacket 24 which, in normal undamaged condition, is both liquid and gas-tight. Carried within jacket 24 is a large number of insulated electrical conductors 26. The interior of jacket 24 is filled with a compressible, inert fluid, preferably air or nitrogen, which is maintained at greater than atmospheric pressure by a conventional compressor system. Preferably, a bleed orifice is installed at the end of the cable to insure a continuous moisture-drying air flow along the length of the cable. However, this is optional and a static system without a bleed orifice may be substituted. In either case, the pressurized fluid within jacket 24 will continuously leak through any small holes developing in the jacket thereby positively preventing the entrance of foreign liquid or gas into the jacket or interior.

For some installations, especially direct-buried, it may be desirable to protect the exterior of jacket 24. For this purpose, a copper liner 28 and a polyethylene outer jacket 30 are employed. These components substantially reduce the likelihood of damage to jacket 24 arising from rodents, excavating equipment, kinking or the like.

To enable the pressurized fluid to flow continuously the entire length of the cable without exhausting at each pedestal position, means must be provided to bypass those portions of the telephone cable which have been stripped away to expose the underlying electrical conductors within the pedestal housing. Such a bypass is constructed by stripping the cable jacket to expose the electrical conductors; installing a bypass tube to form a conduit connecting the jacket interiors on either side of the stripped portion; and sealing the stripped jacket ends so that pressurized fluid within the cable will flow through the bypass tube without exhausting at the bypass tube connection points or through the stripped portion.

The preferred method for constructing such a bypass is sequentially shown in FIGS. 3–11. FIG. 3 illustrates a conventional direct-buried telephone cable 20 with its component parts, i.e., insulated electrical conductors 26, polyethylene jacket 24, copper liner 28 and polyethylene outer jacket 30. It should be understood that the method steps will be described with respect to a single stripped jacket end. Of course, each pedestal position requires two or more such stripped jacket ends between which the conductors are exposed. The inventive method is performed upon each jacket end in a similar fashion. In FIG. 3, the outer jacket 30 is stripped back a considerable distance, a copper liner 28 is stripped back to about ¾ inch from the outer jacket 30 and the cable jacket 24 is stripped back to about 3½ inches from outer jacket 30.

FIG. 4 shows an electrical grounding harness 32 which is clamped to the exposed portion of copper liner 28. It will be seen in FIG. 1 that the grounding harness 32 is subsequently made fast to a grounding lug 34 which is mounted on the pedestal housing 22.

In FIG. 5, the hollow bypass tube 36 is shown with its flanged end 38 positioned against the exposed electrical conductors 26 adjacent the stripped end of jacket 24. Bypass tube 36 can take the form of a double-ended hollow tube with flanges at each end. However, to provide additional flexibility, it may be preferred to employ a bypass tube 36 having a flange 38 at one end (as shown in FIG. 5) and a conventional Schrader valve at the other end. When the latter unit is used, several such bypass tubes can be joined to a branched junction tube which has threaded couplers at each end. When the couplers are detached, the Schrader valves automatically close to maintain the fluid pressure. When the couplers are threadably attached, the valves open to provide a through flow path.

In FIG. 6, electrical tape 40 is tightly wrapped from cable jacket 24, past the stripped jacket end, over and beyond the bypass tube flange 38. This taping step should be carefully done so as to produce a substantially imperforate tape envelope around the cable from the cable jacket extending to beyond the tube flange 38.

In FIG. 7, the groups of electrical conductors 26 have been spread apart and a moldable, non-setting, packing compound 42 worked into the interstices between the conductors. The packing compound should be kneaded thoroughly between the conductors to form an effective seal across the top of the tape envelope 40. The conductors 26 are then squeezed back together.

In FIG. 8, the packing compound layer 42 has been built up so that it extends from cable jacket 24 to over and beyond tape envelope 40. It is helpful to run a band of electrical tape 44 around the top and bottom of the packing compound layer. A suitable packing compound must be moldable and flowable and retain these characteristics for long time periods over a wide temperature range, regardless of the relative humidity. One suitable packing compound has a modified synthetic resin, asbestos and oil as its major constituents and we have obtained excellent results with such a packing compound marketed by Solar Compounds Corporation of Linden, N.J. under its trademark K-M 700. This compound permits bypass units to be installed at temperatures ranging from $-20°$ to $130°$ F. and produces satisfactory performance at temperatures ranging from $-50°$ to $150°$ F., regardless of the relative humidity.

It will now be seen that the method steps illustrated in FIGS. 3–8 have produced a structure in which the packing compound layer 42 has effectively sealed the jacket end 24 to prevent pressurized fluid escape through the stripped cable portion. Also, the tape envelope 40 has prevented the packing compound layer 42 from impeding the flow of fluid from within jacket 24 through bypass tube 36. The remaining steps of our inventive method relate to the provision of an adjustable resilient enclosure around the packing compound layer which operates to maintain the packing layer under continuous pressure, thereby maintaining a continuously effective fluid seal on the jacket end despite wide swings of temperature and humidity. The enclosure additionally serves as a protective barrier for the packing compound layer.

FIG. 12 shows a perspective view of the disassembled framework of the adjustable enclosure 46 which is also shown fully assembled in FIG. 11. The enclosure 46 has top and bottom resilient washers 48 which are split at 50 to facilitate assembly around the conductors 26. The upper washer has a cut-out portion 51 shaped to accommodate the bypass tube 36. Five locking end plates 52 with threaded holes, and three take-up bolts 54 are provided to draw the two resilient washers 48 toward each other without misalignment of the washers.

In FIG. 9, the enclosure framework has been prepositioned around the packing compound layer 42 with the bypass tube 36 pulled clear.

In FIG. 10, take-up bolts 54 have been threadably engaged in the locking end plates 52 and the resilient washers 48 drawn together until they are positioned over the tape bands 44 which are at the upper and lower ends of the packing compound layer 42. A sealant 56, such as polyisobutylene which comes in tape form, is then applied to both resilient washers 48 to seal splits 50 and to encircle the washer peripheries to seal in the packing compound. The sealant tape 56 also serves to hold bypass tube 36 in position in the washer cut-out 51. Additional packing compound 42 is then worked into the enclosure framework until the compound layer forms an approximate cylinder (shown in dashed lines) having the same diameter as the resilient washers 48.

In FIG. 11, the enclosure 46 is shown fully assembled. A flexible cover 58, preferably aluminum or stainless steel, has been wrapped around and over the resilient washers 48. Care should be taken to ensure that cover 58 seats firmly on the polyisoblutylene sealant strips 56 which encircle the washer peripheries. Three straps 60 are then cinched around cover 58, the top strap being tightened firmly, the two lower straps being tightened moderately. The three take-up bolts 54 are then screwed tight after which the lower two straps 60 are tightened firmly. The resulting structure produces a fluid-tight seal on the jacket end permitting fluid flow solely through bypass tube 36.

It will be seen that after the method step shown in FIG. 11 has been carried out the bypass unit is complete and ready to be placed in operation. This is a significant improvement over prior constructions which used liquid potting compounds that required an extended time period for curing before the bypass unit was operative. Also, the materials employed with the bypass unit of our invention are non-toxic and non-irritating to the installer. This too is an important improvement. The fluid-tight seal of our invention constitutes another significant advance. Not only is it operative immediately upon completion, but since the packing compound 42, the washers 48 and the sealing tape 56 all continuously retain their compressible character, the constricting action of take-up bolts 54 and straps 60 produces a constant and enduring sealing force on the jacket end. Thus, if a leak occurs in the area of the bypass unit, it is immediately resealed.

It will be understood that the foregoing is a description of our preferred method and apparatus. Obviously many changes could be made therefrom without departing from the scope and spirit of the invention, the limits of which are solely defined by the claims. For example, the flange 38 of bypass tube 36 could be positioned over an aperture cut into jacket 24 adjacent the stripped jacket end. Also, the tape envelope 40 could be replaced by an envelope of some other imperforate material.

Referring now to FIG. 13, an alternative form of our invention is illustrated. This form is used to facilitate the splicing of cable reel ends. It also finds use in the repair of accidentally severed cable. The unit shown in FIG. 13 is particularly adapted for a buried installation and facilitates the continued pressurization of the spliced buried cable without the necessity of an above-ground pedestal position.

The method of construction of the underground splice kit of FIG. 13 begins with the step shown in FIG. 3, i.e. the outer jacket 30 of each cable end to be splaced is stripped back, then the copper liner 28, then the cable jacket 24. FIG. 4 shows the next step which is to clamp an electrical grounding harness 32 to the copper liner 28 of one of the cable ends. A rigid, noncorrodible hollow tube 62, made from a material such as polyvinyl chloride (PVC) is then slid a considerable distance over one of the severed cable ends. The grounding harness is then clamped to the copper liner 28 of the other cable end as shown in FIG. 13. The electrical conductors 26 are spliced at this time.

A receptacle framework, as shown in FIG. 12 is then positioned over each cable end so that one resilient washer 48 seats on outer jacket 30 and the other resilient washer seats on jacket 24 as shown in FIG. 13. The packing compound 42 of the preferred embodiment is not used in this alternate embodiment because it would ooze under pressure past the resilient washers unless the sealant 56 were applied to the washers. However, if sealant 56 were run around the washer peripheries its strong adhesive action would prevent hollow tube 62 from being slid into place over the receptacle frameworks. Therefore, after the receptacle frameworks have been positioned as described, a quantity of sealant 66, such as polyisobutylene, is worked into the space between the washers 48 and is built up to form a cylinder having a slightly smaller diameter than washers 48.

The rigid tube 62 is then drawn back over the receptacle frameworks and anchored into position by a pair of cotter pins 64 which pass completely through tube 62. The cotter pins are slightly offset so as to avoid the central location of the cable.

To complete the fluid-tight seal, the take-up bolts 54 are tightened to compressibly urge resilient washers 48 against sealant filler 66 to produce continuous pressure thereon against the interior of PVC tube 60. The jacket 24 can then be repressurized since each end of the tube 62 is completely sealed.

For repair purposes, if the cable were not completely severed, a combination of the preferred and alternate embodiments of FIGS. 11 and 13, respectively, could be constructed. For example, if the jacket 24 were scraped, but the conductors not severed, the scraped portion should first be taped with electrical tape or the like to form an imperforate envelope. The framework of FIG. 12 is then positioned to bridge the scraped jacket portion, the packing compound and polyisobutylene layers added as in FIG. 10 and the receptacle assembled as in FIG. 11 except for the omission of the bypass tube 36. Thus the scraped jacket is sealed in fluid-tight fashion.

In conclusion, it will be understood that the method and apparatus of our invention feature the employment of moldable and flowable packing components maintained by resilient washers under continuous pressure to achieve a fluid-tight seal. Although the foregoing description of preferred and alternate embodiments has been made with respect to telephone cable, obviously many other types of cables or conduits are suitable for use with this invention. Therefore, the definition of our invention will be found exclusively in the claims which follow.

We claim:
1. For use with an internally pressurized continuous electrical cable having a jacket and a plurality of electrical conductors within said jacket, an immediately operative fluid-tight bypass between two adjacent sections of the cable between which the jacket has been stripped and the conductors are exposed, said fluid-tight bypass comprising at each stripped jacket end;
  (a) A fluid-tight, hollow bypass tube having a flanged end positioned against the exposed conductors at a location adjacent the stripped end of the cable jacket;
  (b) A substantially imperforate envelope of sheathing material wrapped intimately around the cable extending from the cable jacket over and beyond the bypass tube flanged end;
  (c) A layer of moldable, non-setting packing compound extending over and beyond both ends of the sheathing envelope, said packing compound layer sealing one envelope end to the cable jacket and completely inundating the interstices of the electrical conductors to plug and seal the other envelope end; and
  (d) An adjustable enclosure positioned around and entirely filled by the packing compound layer and producing continuous pressure thereon to create a continuously fluid-tight encapsulation of the stripped end of the cable jacket, the bypass tube being positioned to extend exteriorly of said enclosure to maintain a clear fluid flow path from the jacket interior through the bypass tube, said adjustable enclosure including,
    (i) two resilient washers, one being positioned around the cable jacket and the other being positioned around the packing compound covered conductors at a location beyond the sheathing envelope,
    (ii) a flexible cover extending between and wrapped around said resilient washers,
    (iii) take-up strap means for encircling and tightly constricting the cover against the resilient washers and the packing compound layer,
    (iv) locking end plates positioned on the nonfacing sides of the resilient washers, and
    (v) take up means for linking and drawing the locking end plates toward each other to compressibly urge the resilient washers against the packing compound layer;
whereby connection of the exteriorly positioned bypass tubes establishes an immediately operative fluid-tight flow path between the jacket interiors of the two adjacent cable sections between which the jacket has been stripped.

2. For use with an internally pressurized electrical cable having a jacket and a plurality of electrical conductors within said jacket, an immediately operative fluid-tight connection between two adjacent cable ends between which the conductors were initially unconnected, said fluid-tight connection comprising:
  (a) A pair of axially aligned, spaced apart resilient washers positioned on the cable jacket at each cable end;
  (b) Locking end plates positioned on the non-facing sides of each pair of resilient washers and take-up bolts running between each pair of said locking end plates to adjustably link each pair of said end plates;
  (c) A quantity of moldable, non-setting adhesive sealant entirely filling the space between each pair of resilient washers;
  (d) An open-ended hollow tube co-axially positioned around both pairs of resilient washers, said hollow tube extending between and enclosing both resilient washer pairs; and
  (e) The take-up bolts being tightened sufficiently to draw the end plates of each locking end plate pair toward each other to compressibly urge the washers against the adhesive sealant to produce continuous pressure thereon against the hollow tube interior to create a continuously fluid-tight encapsulation at each end of the hollow tube while maintaining a clear fluid flow path between the cable ends within the hollow tube.

References Cited

UNITED STATES PATENTS

| 2,246,286 | 6/1941 | Baillard | 174—23 |
| 2,635,132 | 4/1953 | Rogoff | 174—20 |
| 2,771,502 | 11/1956 | King et al. | 174—88 |
| 2,788,385 | 4/1957 | Doering et al. | 174—77 X |
| 2,938,940 | 5/1960 | Calendine et al. | 174—76 |
| 2,957,038 | 10/1960 | Greenidge et al. | 174—23 |
| 3,187,081 | 6/1965 | Bollmeier | 174—76 X |
| 3,215,761 | 11/1965 | Gelpey | 174—22 X |

LEWIS H. MYERS, *Primary Examiner.*

A. T. GRIMLEY, *Assistant Examiner.*

U.S. Cl. X.R.

29—461; 174—38, 77, 107